(12) United States Patent
    Kim

(10) Patent No.: US 12,533,063 B2
(45) Date of Patent: Jan. 27, 2026

(54) SYSTEMS, METHODS, AND DEVICES FOR PASSENGER MONITORING

(71) Applicant: SUPERNAL, LLC, Washington, DC (US)

(72) Inventor: Dae Jin Kim, Washington, DC (US)

(73) Assignee: Supernal, LLC, Washington, DC (US)

( * ) Notice: Subject to any disclaimer, the term of this patent is extended or adjusted under 35 U.S.C. 154(b) by 0 days.

(21) Appl. No.: 18/842,994

(22) PCT Filed: Mar. 3, 2023

(86) PCT No.: PCT/US2023/063659
    § 371 (c)(1),
    (2) Date: Aug. 30, 2024

(87) PCT Pub. No.: WO2023/168389
    PCT Pub. Date: Sep. 7, 2023

(65) Prior Publication Data
    US 2025/0169733 A1    May 29, 2025

Related U.S. Application Data

(60) Provisional application No. 63/268,862, filed on Mar. 4, 2022.

(51) Int. Cl.
    *A61B 5/16*       (2006.01)
    *A61B 5/00*       (2006.01)
    (Continued)

(52) U.S. Cl.
    CPC ............ *A61B 5/165* (2013.01); *A61B 5/746* (2013.01); *B60Q 9/00* (2013.01); *G06V 20/59* (2022.01);
    (Continued)

(58) Field of Classification Search
    None
    See application file for complete search history.

(56) References Cited

U.S. PATENT DOCUMENTS

2003/0058112 A1*  3/2003  Gleine ............... B64D 45/0036
                                                         109/3
2012/0163670 A1   6/2012  Eaton et al.
                         (Continued)

OTHER PUBLICATIONS

International Search Report issued in Int'l Application No. PCT/US2023/063659, mailed Jul. 27, 2023, 3 pages.
(Continued)

*Primary Examiner* — Samuel D Fereja
(74) *Attorney, Agent, or Firm* — McDonnell Boehnen Hulbert & Berghoff LLP

(57) ABSTRACT

Systems, methods, and devices for a monitoring system of a vehicle which may include one or more processors. A sensor interior to a cabin of a vehicle may sense a passenger behavior of a passenger of the vehicle. A behavior characteristic based on the passenger behavior may be determined and based on one or more of a comparison of the passenger behavior and a stored passenger behavior, a weight parameter associated with the passenger behavior, and a trigger associated with one or more sensors. An assessment signal may be determined based on the determined behavior characteristic. The assessment signal may be sent to a monitoring network and the monitoring network may receive the assessment signal. A proposed action may be determined based on the assessment signal and the proposed action may be sent to the vehicle. A next action may be determined based on the proposed action.

20 Claims, 10 Drawing Sheets

(51) Int. Cl.
*B60Q 9/00* (2006.01)
*G06V 20/59* (2022.01)
*G06V 40/20* (2022.01)
*H04N 7/18* (2006.01)
*H04N 23/698* (2023.01)

(52) U.S. Cl.
CPC ............ *G06V 40/20* (2022.01); *H04N 7/18* (2013.01); *H04N 23/698* (2023.01)

(56) References Cited

U.S. PATENT DOCUMENTS

| | | |
|---|---|---|
| 2017/0113801 A1 | 4/2017 | Brunaux et al. |
| 2020/0307825 A1 | 10/2020 | Brüchmann |
| 2022/0121838 A1 | 4/2022 | Goyal et al. |
| 2025/0065890 A1* | 2/2025 | Theisinger ........ B60W 50/0098 |

OTHER PUBLICATIONS

Written Opinion issued in Int'l Application No. PCT/US2023/063659, mailed Jul. 27, 2023, 6 pages.

* cited by examiner

SYSTEMS, METHODS, AND DEVICES FOR PASSENGER MONITORING

RELATED APPLICATIONS

This application is a § 371 national stage of international application no. PCT/US2023/063659, filed on Mar. 3, 2023, which claims the benefit under 35 U.S.C. § 119 (e) to U.S. Provisional Application No. 63/268,862 filed Mar. 4, 2022, both of which are incorporated by reference herein in their entirety.

FIELD OF THE DISCLOSURE

The present disclosure relates to systems, methods, and devices for a monitoring system of a vehicle.

BACKGROUND

Travel and transport are an intrinsic part of the human experience, enabling common activities such as commuting to and from a workplace, exploration, and migration. In modern times, there are a variety of modes of transportation, such as trains, aircraft, spacecraft, automobile, and ships.

Many people travel via aircraft transportation. With the increase in the number of flights occurring and the number of people traveling on flights, flight security remains a forefront issue. Some anticipate less or no staff on future vehicles, such as flight services over short and/or long distances, charter flights, and autonomous flights, which means that those vehicles may not include staff available to respond to passenger problems. Nonetheless, passengers and crew in such vehicles still require protection to ensure safe travel. Further, such vehicles may represent a potential hazard to persons and property surrounding the vehicle during travel, and thus the vehicle itself also requires protection.

People also travel via train. Train security has been a longstanding problem dating back as far as the 1800's where train robberies were commonplace. In modern times, security concerns have revolved around preventing attacks on train infrastructure, avoiding train derailments, and detecting suspicious passenger behavior. With the emergence of autonomous transportation, rail transportation is envisioned to include reduction to onboard staff, thereby hampering the detection and/or reporting of suspicious passenger behavior or other dangers. Similarly, emergence of autonomous ships, and automobiles present similar challenges of detecting and reporting suspicious passenger behavior or other dangers.

Current monitoring systems remain inadequate and the increase in flight security technology also brings with it issues surrounding passenger privacy. For example, if passengers conduct harmful activities, intentional or not, the flight operator may be unaware of them and unable to respond. In other examples, it may be difficult or impossible to maintain a conversation to ask passengers as to various health issues. It is desirable for a monitoring system to accurately monitor the vehicle for security and passenger health. Improved monitoring systems may provide other methods and systems for appropriate responses.

Current systems such as remote video feeds and remote sensors can be used for passenger monitoring, but such systems struggle to identify harmful activities and further fail to include a capability of maintaining privacy of passengers. It is thus also desirable to improve monitoring of a vehicle to protect passenger privacy.

SUMMARY

In the following description, certain aspects and embodiments will become evident. It is contemplated that the aspects and embodiments, in their broadest sense, could be practiced without having one or more features of these aspects and embodiments. It is also contemplated that these aspects and embodiments are merely exemplary.

Exemplary disclosed embodiments include systems, methods, and devices for a monitoring system of a vehicle. A vehicle comprising one or more processors may be included. A sensor interior to a cabin of an aircraft may sense a passenger behavior of a passenger of the aircraft. A behavior characteristic based on the passenger behavior may be determined and based on one or more of a comparison of the passenger behavior and a stored passenger behavior, a weight parameter associated with the passenger behavior, and a trigger associated with one or more sensors. A trigger may refer to a physical input, such as a shake, impact, a mechanical switch, or the like. A trigger may also refer to a exceeding of a threshold, for example, a threshold level of risk and unsafety, or other thresholds. An assessment signal may be determined based on the determined behavior characteristic. The assessment signal may be sent to a monitoring network and the monitoring network may receive the assessment signal. A proposed action may be determined based on the assessment signal and the proposed action may be sent to the aircraft. A next action may be determined based on the proposed action.

Exemplary disclosed embodiments include systems, methods, and devices for a monitoring system of a vehicle. A vehicle comprising one or more processors may be included. A sensor interior to a cabin of a vehicle may sense a passenger behavior of a passenger of the vehicle. A behavior characteristic based on the passenger behavior may be determined and based on one or more of a comparison of the passenger behavior and a stored passenger behavior, and a weight parameter associated with the passenger behavior. An assessment signal may be determined based on the comparison. The assessment signal may be sent to a monitoring network and the monitoring network may receive the assessment signal. A proposed action may be determined based on the assessment signal and the proposed action may be sent to the aircraft. A next action may be determined based on the proposed action.

Exemplary disclosed embodiments include systems, methods, and devices for a monitoring system of a vehicle. One or more sensors interior to a cabin of a vehicle may detect characteristic features of a passengers of the vehicle (e.g., face expressions, actions, voice, temperature, or the like.) useful to determine the passenger's behavior. A characteristic behavior of a passenger may be determined encoding the features detected by the sensors and comparing them with an archive of encoded behaviors stored in memory. A weight parameter can be associated with the passenger behavior, indicating its level of risk and unsafety. A level of risk and unsafety above a certain threshold could trigger an assessment signal. An assessment signal may be determined based on the determined behavior characteristic. The assessment signal may be sent to a monitoring network and the monitoring network may receive the assessment signal. A proposed action may be determined based on the assessment signal and the proposed action may be sent to the vehicle. A next action may be determined based on the proposed action.

Exemplary disclosed embodiments include systems, methods, and devices for a monitoring system. The monitoring system may comprise a vehicle comprising one or more processors, wherein the one or more processors are configured to: sense, via a sensor of the vehicle, a passenger behavior of a passenger of the vehicle; determine, based on the comparison, an assessment signal based on the determined behavior characteristic; send the assessment signal to a monitoring network; send a recorded sensor data from the sensor to the monitoring network; receive a proposed action based on the assessment signal; and determine a next action based on the proposed action; the monitoring network comprising one or more processors, wherein the one or more processors are configured to: receive the recorded sensor data and the assessment signal; determine a behavior characteristic based on the passenger behavior, wherein the behavior characteristic is based on one or more of: a first comparison of the passenger behavior and a first stored passenger behavior, wherein the first stored passenger behavior is stored on a first memory associated with the monitoring network; a weight parameter associated with the passenger behavior; send the determined behavior characteristic to a check network; and send the proposed action to the vehicle; the check network comprising one or more processors, wherein the one or more processors are configured to: verify the assessment signal based on a second comparison of the passenger behavior and a second stored passenger behavior, wherein the second stored passenger behavior is stored on a second memory associated with the check network; determine the proposed action based on the assessment signal; and send the proposed action to the monitoring network. In some embodiments, one or more of the first and second stored passenger behaviors are an aggregate of recorded passenger behaviors or a number of selected passenger behaviors.

It is to be understood that both the foregoing general description and the following detailed description are exemplary and explanatory only and are not restrictive of the invention. The accompanying drawings, which are incorporated in and constitute a part of this specification, illustrate several exemplary embodiments and together with the description, serve to outline principles of the exemplary embodiments.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

DESCRIPTION OF EXEMPLARY EMBODIMENTS

Figure 1:
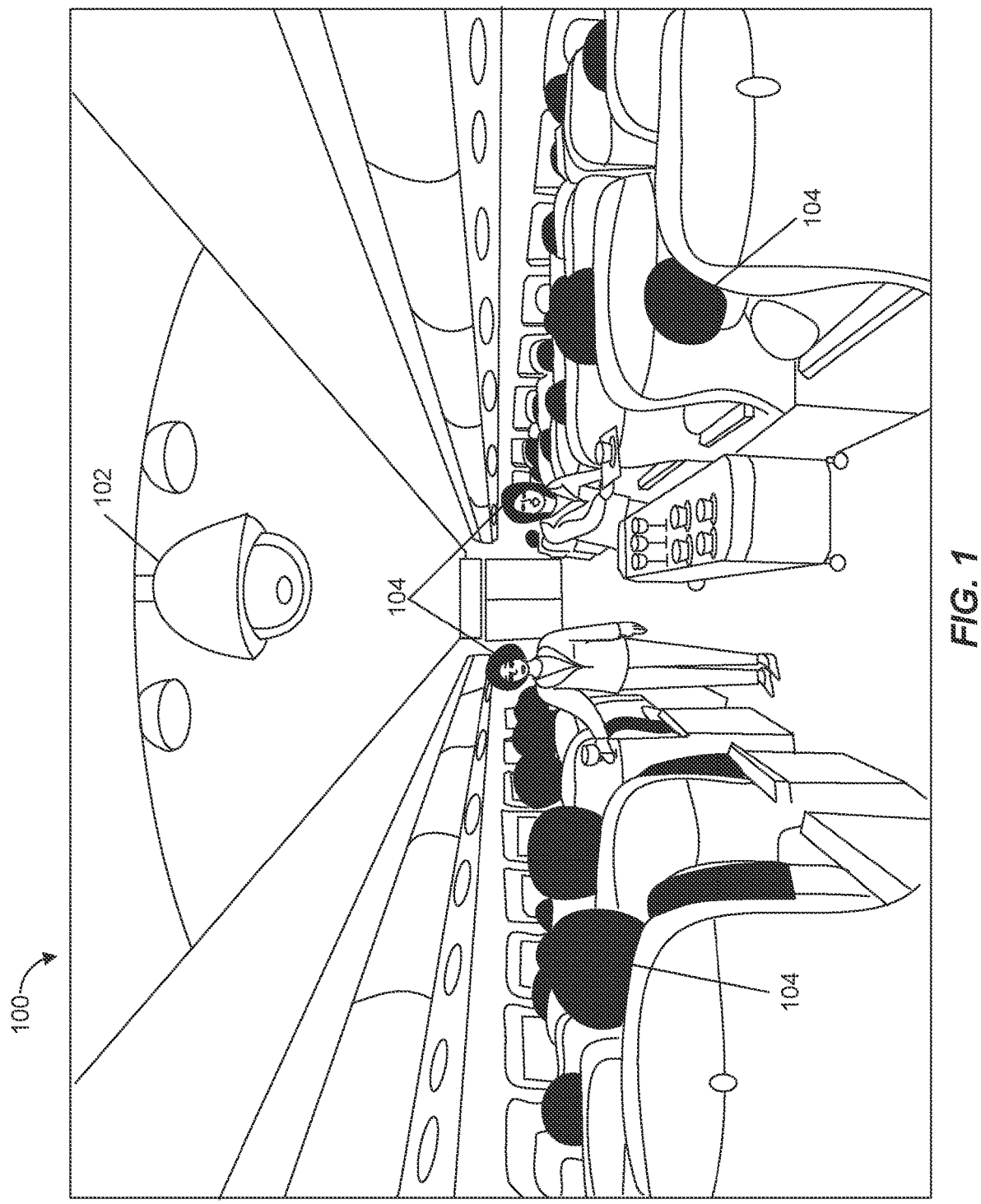
FIG. 1 illustrates an exemplary monitoring system consistent with disclosed embodiments.

Reference will now be made in detail to exemplary embodiments, shown in the accompanying drawings.

Exemplary disclosed embodiments include systems, methods, and devices for monitoring systems for one or more passenger areas of a vehicle. The systems, methods, and devices may include a vehicle comprising one or more processors. Monitoring systems may refer to an operation, procedure, process, structure, or a similar set of procedures in which an area is checked, supervised, controlled, observed, tracked, or similarly watched. Non-limiting examples of monitoring systems may include at least one of: monitoring over a period of time, monitoring an area, and monitoring passengers. Aircraft may refer to, for example, an aerial, floating, soaring, hovering, airborne, aeronautical aircraft, airplane, plane, vessel, or other vehicles moving or able to move through air. Non-limiting examples may include a helicopter, an airship, a hot air balloon, an autonomous aerial vehicle, a vertical takeoff craft such as a rotorcraft, a vertical takeoff and landing vehicle ("VTOL"), or a drone.

A ship or boat may refer to, for example, a watercraft that is used on water or underwater. A ship can include a propulsive capability, such as a sail, oar, paddle, or engine, or motor. Non-limiting examples of ships include a submarine, an underwater robot, a sailboat, a pontoon boat, riverboat, ferry boat, tugboats, towboats, steamboats, hovercraft, yacht, tanker, container ship, cruise ship, motorboat, kayak, frigate, fishing boat, cruiser, catamaran, cutter or the like.

A train may refer to, for example, one or more connected vehicles pulled or pushed by a locomotive, or self-propelled, that run along a track and configured to transport people and/or freight. Non-limiting examples of a train can include a steam, natural gas, hydrogen, diesel, or electric locomotives. Non-limiting types of trains may include high-speed rail, commuter rail, light rail, monorails, or funiculars.

An automobile may refer to a motor vehicle with wheels. An automobile can include an internal combustion engine, an electric motor, or a hybrid. Non-limiting types of automobiles may include sedans, hatchbacks, trucks, lorries, vans, tractors, SUVs, crossovers, jeeps, or the like.

As referred to herein, a spacecraft can refer to a vehicle or machine designed to fly in outer space. Examples of spacecraft include shuttles, stations, planes, modules, satellites, capsules, probes, or the like.

As referred to herein, a vehicle may be at least one of: an aircraft, an automobile, a ship, a spacecraft, or a train.

One or more processors may refer to at least one of a central processing unit (CPU), a central processor, a mainframe, a microprocessor, or a similar circuit that performs calculations that run a computer or computing device. Non-limiting examples of one or more processors may refer to a processor associated with a vehicle, a processor associated with a sensor, a processor associated with a handheld electronic device, or a combination of processors.

In some embodiments, the one or more processors may sense, via a sensor interior to a cabin of a vehicle, a passenger behavior of a passenger of the vehicle. Sense may refer to a sensor detecting, finding, noticing, observing, recognizing or any other way a sensor can discover or identify the presence, existence, or change of an environment. Non-limiting examples of a sensor sensing may include a sensor that responds to an external stimulus. An external stimulus may be a change in the environment. Sensor may refer to a device, module, machine, or subsystem that senses an environment. The sensor may send the sensed information to another object. The sensor may send the sensed information via a processor. Non-limiting examples of a sensor may be an image sensor, a motion sensor, a temperature sensor, an infrared sensor, a light sensor, a chemical sensor, a biosensor, a monitoring sensor, and a noise sensor. As an example, the sensor may be a camera.

The sensor may be configured to detect at least one of a sound, an image, light, a signal, pressure, temperature, and gas. Sound may refer to any vibration that propagates or transmits as an acoustic wave. Non-limiting examples of sound may include a loud sound, a soft sound, a medium sound, an infrasonic sound, a sonic sound, and an ultrasonic sound. Image may refer to a representation or artifact that depicts visual perception. Non-limiting examples of image may include a photograph, two-dimensional picture, or three-dimensional representation. The sensor may include a video sensor capable of performing processing of detected images to detect and/or characterize behaviors or actions of individuals, as known to those skilled in the art. Light may refer to electromagnetic radiation. For example, the sensor may detect light so that the image sensor may be adjusted so that it can capture an appropriate contrast in the vehicle. As another example, the sensor may detect flashes associated with dangerous conditions or activity within the vehicle. As another example, the sensor may detect a lack of light, for example, when the sensor is blocked. Non-limiting examples of light may include radio waves, microwaves, infrared, visible, ultraviolet, x-rays, and gamma rays. Signal may refer to anything that serves to indicate, warn, direct, command, or similar indicator. Non-limiting examples of signals may include motion or auditory.

Force may refer to energy exerted. Non-limiting examples of force may include an impact, prying, or prodding. For example, a sensor may detect when a compartment, sensor, or wall has been subjected to tampering. Pressure may refer to an amount of force over an area. Non-limiting examples of pressure may include air pressure, ambient air pressure, atmospheric pressure, and barometric pressure. For example, a sensor may detect a decrease in cabin pressure, indicating a dangerous situation such as tampering or a leak in the cabin. Temperature may refer to a quantity that expresses the degree of hotness or coldness of a substance or object. Non-limiting examples of temperature may include 68° F., 98° F., 20° C., and 37° C. For example, a sensor may detect a higher temperature, like 110° F., indicating a dangerous situation such as fire or an open flame. Gas may refer to a substance or matter able to expand freely. Non-limiting examples of gas may include air, monoxide, oxygen, carbon monoxide, and nitrogen. For example, a sensor may detect a high level of monoxide or carbon monoxide indicating a dangerous situation. As another example, a sensor may detect whether oxygen sufficient to sustain minimum or optimum breathable air in the vehicle.

Interior may refer to an internal, inside, inward, or similar inner or indoor part of a vehicle. Cabin may refer to a compartment, room, or other similar area where passengers occupy. A passenger behavior may refer to a passenger's action, attitude, conduct, demeanor, nature, presence, gesture, inaction, or other similar way or manner in which a passenger conducts oneself. Non-limiting examples may include walking, sitting, running, moving, tasting, drinking, making noise, crying, using threatening language, body movements, and sleeping. For example, the sensor interior to the cabin of the vehicle may sense the passenger behavior of a passenger of the vehicle.

FIG. 1 illustrates an exemplary monitoring system consistent with disclosed embodiments. As illustrated in FIG. 1, the system may include a cabin 100 of a vehicle with sensor 102 interior to cabin 100. FIG. 1 also illustrates members 104 of the cabin crew attending to the passengers (i.e., serving drinks). Of course, as discussed above, a cabin crew may or may not be present and are illustrated merely as an example.

Figure 2:
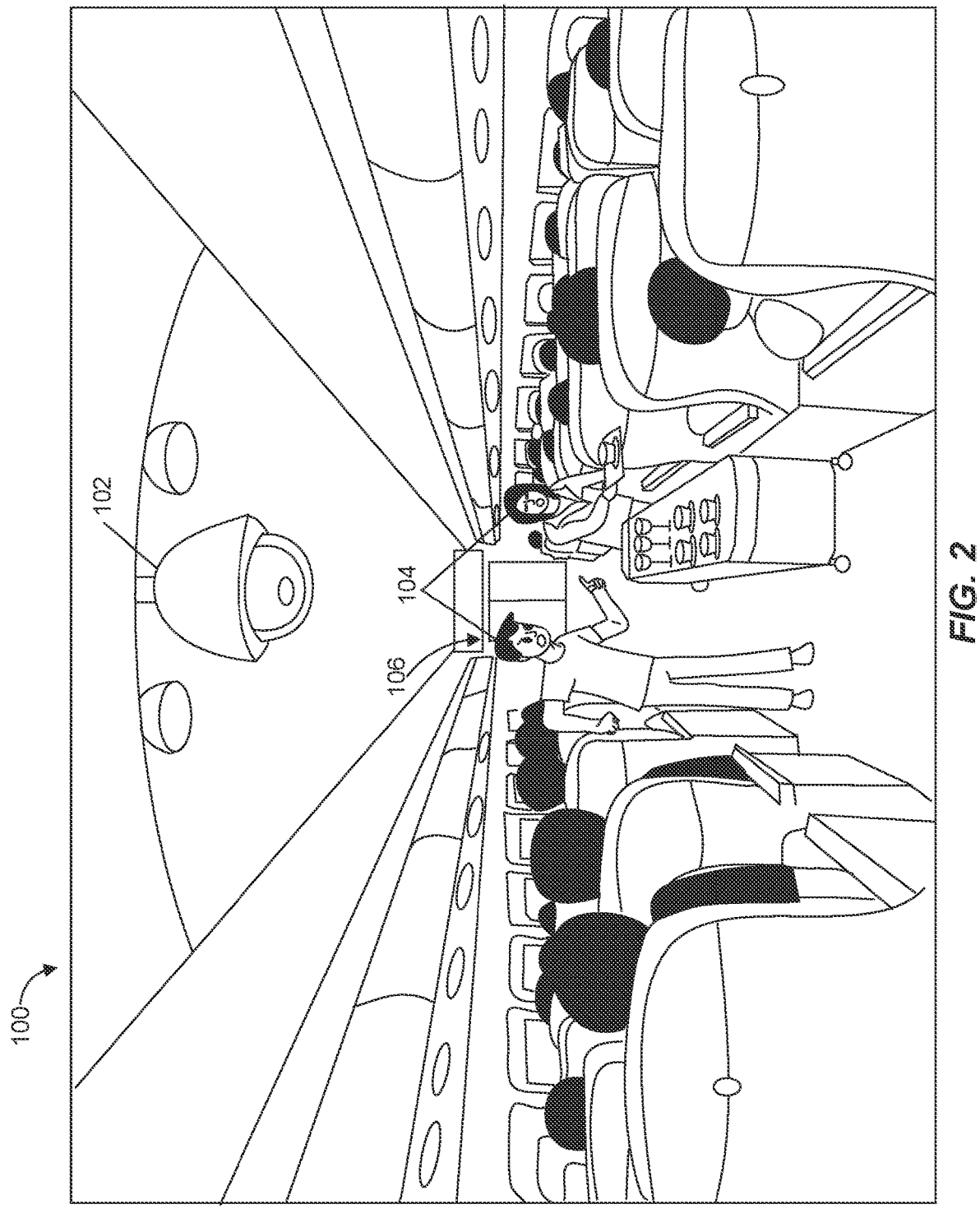
FIG. 2 illustrates an exemplary monitoring system consistent with disclosed embodiments.

FIG. 2 illustrates an exemplary monitoring system consistent with disclosed embodiments. As illustrated in FIG. 2, cabin 100 of the aircraft may include a sensor 102 interior to cabin 100 for sensing the behavior of a passenger, such as the individual designated as 106. In this example, passenger 106 may be using threatening body language and/or yelling at a cabin crew member 104 or other passengers. As discussed above, while members 104 of the cabin crew are depicted here, it will be understood that crew members may or may not be present and are not necessary for the system according to the present invention. Sensor 102 as an image sensor 102 with a wide-angle lens configured to capture passenger behavior 106. In some embodiments, sensor 102 can be a camera with a narrow field of view and include a microphone. In some embodiments, sensor 102 may be a microphone. Sensor 102 may be able to capture the entire area of cabin 100 of a vehicle.

According to some embodiments, the one or more processors may determine a behavior characteristic based on the passenger behavior. A behavior characteristic may refer to an aspect, attribute, likelihood of a next action, or other similar feature or trait of a passenger. In some examples, the behavior characteristic may take into account or be based on a passenger behavior, such as actions, gestures, or expressions. For example, when a passenger removes his or her seatbelt and moves about the cabin, the behavior characteristic determined may be unsafe because of this type of behavior. In another example, when a passenger has made a threatening movement and/or a threatening gesture, the behavior characteristic determined may be dangerous because of this type of behavior. The behavior characteristic may be based on one or more of a comparison of the passenger behavior and a stored passenger behavior, a weight parameter associated with the passenger behavior, and a trigger associated with one or more sensors. A comparison may refer to a consideration or estimate of the similarities and/or dissimilarities between a passenger behavior and a stored passenger behavior.

A characteristic behavior of a passenger may be determined by encoding the features detected by the sensors and comparing them with an archive of encoded behaviors stored in memory. A comparison may refer to a consideration or estimate of the similarities and/or dissimilarities between a passenger behavior and a stored passenger behavior. Encoding refers to represents the characteristics features with numerical values encapsulated in a data structure, like but not limited to a vector, or a matrix.

A stored passenger behavior may refer to one or more passenger behaviors retained, accumulated, entered, or similarly kept for future retrieval. A non-limiting example of a stored passenger behavior may be one or more passenger behaviors kept in a memory or a storage associated with a computer. For example, the passenger's removal of his or her seatbelt and movement about the cabin may be compared with and/or against stored passenger behaviors to determine if the passenger behavior is new and/or has been recognized before. These actions are based on the outputs of sensors such as video processing and/or other sensors connected to a passenger seat, seatbelt or other restraining or safety device, discussed above. If the passenger behavior is new, it may be labeled, created, or linked as a new passenger characteristic and stored for future use. Alternatively, if the passenger behavior is not new, the passenger behavior may be grouped and/or placed with one or more of the stored passenger behaviors linked with the associated behavior characteristic.

A weight parameter can be associated with the passenger behavior, indicating its level of risk and unsafety. A weight parameter may refer to a mathematical device used to give a passenger behavior more "weight" on a result than other elements or factors in the determination. Non-limiting examples of the weight parameter may include at least one of an integer and an indicator associated with a scale. The weight parameter may be based on at least one of a confidence factor, a reliability factor, and an influence factor. The weight parameter may include an aggregation or multiplication of one or more factors.

A confidence factor may refer to a range of estimates for an unknown parameter with a lower bound and an upper bound. Non-limiting examples of confidence factors may include a 95% confidence factor, a 90% confidence factor, and a 99% confidence factor. For example, a 95% confidence factor may refer to a determined passenger behavior matching overall determined passenger behaviors from a population 95% of the time. A reliability factor may refer to an overall consistency of a measure. Non-limiting examples of a reliability factor may include a high reliability factor where similar results are produced under consistent conditions or a low reliability factor where not similar results are produced under consistent conditions. An influence factor may refer to an effect on a passenger behavior. For example, the weight parameter associated with a passenger behavior of walking may be relatively small due predominantly to the influence factor bringing down the overall weight because walking is a common activity. In another example, the weight parameter associated with a passenger behavior of threatening movements and/or threatening gestures may be larger due predominantly to the influence factor bringing up the overall weight because these behaviors are not common compared to walking. Thus, in these two examples more influence or "weight" is given to the passenger behavior of threatening or dangerous movements and/or threatening gestures than the influence of walking when determining the behavior characteristic.

A trigger associated with one or more sensors may refer to an action, inaction, or alert that causes an event to happen or exist. Non-limiting examples of a trigger may include a passenger pulling an input device (e.g., a fire alarm), a passenger striking an object or other passenger, tampering, or a noise over a certain decibel threshold or limit. For example, the one or more sensors may be an audio sensor that may detect sound waves and convert the sound waves into electrical signals. In another example, the one or more sensors may be an image sensor that analyzes and/or compares images taken over a period of time to assess a situation or area. The determination of the behavior characteristic may be based on one or more of the comparison, the weight parameter, and the trigger.

In some embodiments, the one or more processors may determine an assessment signal based on the level of risk and unsafety given by the weight parameter and/or the determined behavior characteristic. An assessment signal may refer to a transmittal of information or instructions by means of an action, sound, or electrical wave indicating a judgment, computation, determination, rating, valuation, evaluation, or other similar opinion on the nature, character, or quality of the determined behavior characteristic. Non-limiting examples of assessment signals may be low, medium, and high, or good and bad, or a number from a scale of numbers (e.g., 1-10). Assessment signals may also be one-dimensional or multi-dimensional. Multi-dimensional may refer to an assessment signal in which more than one signal exists. In some examples, the determination of the assessment signal may be based on the determined behavior characteristic. For example, if the determined behavior characteristic is dangerous, the assessment signal may be "7." In another example, if the determined behavior characteristic is unsafe, the assessment signal may be "3." In an example of a multi-dimensional assessment signal, both of the previous assessment signals might be included such as {dangerous: 7, unsafe: 3}.

In some embodiments, the one or more processors may send the assessment signal to a monitoring network. Send may refer to transmit, deliver, dispatch, relay, communicate, or similarly transfer an assessment signal. For example, an assessment signal may be transferred in the form of a digitized analog signal over a wireless communication system.

Disclosed embodiments may include a monitoring network comprising one or more processors. A monitoring network is a system that monitors, watches, or oversees a computer network with one or more computer networking components. For example, the monitoring network may include one or more processors and one or more vehicles comprising one or more processors. In some embodiments, the one or more processors of the monitoring network may receive the assessment signal from the vehicle. The monitoring network may receive an assessment signal. The assessment signal may be sent via one or more processors of the vehicle. The monitoring network may also receive multiple assessment signals from one or more processors or multiple vehicle.

In some embodiments, the one or more processors of the vehicle, monitoring network, or check network may determine the proposed action based on the assessment signal. A proposed action may refer to a strategy, plan, approach, policy, procedure, course, instructions, or a similar process or state of acting put forward or suggested for consideration. In some embodiments, the proposed action may be based on an assessment signal. For example, when the assessment signal is a higher number on a scale of 1-10, such as a "7," the proposed action may be that of limiting the number of alcoholic drinks to be given to a passenger. In another example, when the assessment signal is a lower number on the scale of 1-10, such as a "3," the proposed action may be that of monitoring the passenger. The monitoring of the passenger could occur, for example, on a heightened level.

In some embodiments, the one or more processors may send a proposed action based on the assessment signal. In some embodiments, the one or more processors of the vehicle may receive a proposed action through communication from the monitoring network. The one or more processors of a vehicle may receive the proposed action plan based on the assessment signal. The proposed action may be sent via the one or more processors of the monitoring network.

In some embodiments, the one or more processors of a vehicle may determine a next action based on the proposed action. In some embodiments, processors associated with a monitoring network or a check network may determine a next action based on the proposed action and communicate the determined action to the one or more processors of the vehicle for execution. A next action may refer to a strategy, plan, approach, policy, procedure, course, instructions, or a similar process or act based on one or more of a proposed action, an input from one or more of a pilot, a check monitor, an attendant, a passenger, or a controller, and a status of a vehicle. Non-limiting examples of the next action may be the proposed action, an alternative or similar action to the proposed action, or an opposite action or plan than the proposed action. For example, when the proposed action may be that of restraining the passenger, the next action may be the proposed action. Alternatively, the proposed action may be ignored and/or not followed. As another example, the next action may be affected by input from a pilot, an attendant, a passenger, or a controller, such as if a passenger asks for help, an attendant indicates a dangerous situation, or a pilot indicates an all clear. As another example, a next action may be that of determining to land based on a position of the vehicle, such as relatively soon after taking off or mid-flight. As another example, a next action may be that of requesting medical or safety personnel being present at a landing sight.

In some embodiments, the sensor may be an image sensor with a wide-angle lens configured to capture the passenger behavior. An image sensor may refer to an imager or sensors that detects and conveys information used to make an image. For example, the image sensor may convert incoming lights (e.g., photons) into an electrical signal that can be viewed, analyzed, and/or stored. The image sensor may include a wide-angle lens configured to capture the passenger behavior. Non-limiting examples of the image sensor may include an ultra-wide-angle lens or a fisheye lens. For example, a fisheye lens may be installed or placed in a vehicle. The fisheye lens may be installed or placed in a cabin of the vehicle, for example, on the ceiling of the cabin to capture passenger behaviors.

In some embodiments, the one or more processors of the monitoring network may send the assessment signal to a check monitoring network and determine the proposed action based on the check monitoring network and the assessment signal. A check monitoring network may refer to a monitoring network that analysis, audits, controls, reviews, or similarly examines an assessment signal to determine its accuracy, quality, condition, and/or to detect the presence of something. For example, the one or more processors of the monitoring network may send the assessment signal of "7" to the check monitoring network. In some examples, the check monitoring system may send back to the one or more processors of the check monitoring network an affirmance or denial associated with the assessment signal. The one or more processors of the monitoring network may determine a proposed action based on the check monitoring network's affirmance or denial and the assessment signal itself.

In some embodiments, the check monitoring network may be configured to generate a check determination. In some embodiments, the check determination may replace or supersede the assessment signal. In some embodiments, one or more of the check determination and the assessment signal may both be considered when a monitoring network and/or a vehicle determines a proposed action.

The check monitoring network may be configured to receive an input from a user or a program to check the assessment signal. Non-limiting examples of checking the assessment signal may include reviewing data from a sensor interior to a vehicle to determine if the assessment signal accurately reflects a correct behavioral characteristic. As an example, the assessment signal may be compared against one or more of a stored assessment signal, a weight parameter associated with the assessment signal, and a trigger associated with one or more sensors. Based on the comparison, the user or program may provide a check determination, for example, good/bad, a score (e.g., one through ten), or similar. In some embodiments, the input from the user or the program may be compared to the assessment signal to determine a delta between the assessment signal and a check determination by the check monitoring network. Delta may refer to a change of any changeable quantity, a difference of any changeable quantity, or a similarity of any changeable quantity. Non-limiting examples of delta may include perfect, mediocre, poor, 100%, 50%, or 0%. The delta may be used to determine a volatility associated with the assessment signal or to determine a false positive. Volatility may refer to a degree of variation associated with the assessment signal. A false positive may refer to the assessment signal incorrectly indicating an assessment. The delta may be stored and associated with at least a portion of the assessment signal such that the monitoring network or the check monitoring network may compare assessment signals against the delta. In some embodiments, stored deltas, volatility, or false positives may be aggregated and/or averaged to improve next determinations of a proposed action.

In some embodiments, assessment signals or deltas may be abstracted or categorized in relation to a category of assessment signals based on a behavior characteristic, a passenger behavior, or an assessment signal. In some embodiments, stored passenger behaviors may be selected based on previous examples of behaviors associated with a safety/health risk and/or a high assessment rating. The safety/health risk and/or high assessment rating may be ones that have been verified by the check system based on the above methods and/or a user or operator.

In some embodiments, the next action may comprise sending an indication signal, wherein the indication signal may be configured to convey an alert to the passenger of the vehicle. An indication signal may refer to a signal expressing, warning, or similarly giving a sign or piece of information that indicates something. Non-limiting examples of the indication signal may be a signal sent that is received by the one or more processors of a vehicle and converted or analyzed. Convey may refer to an action or inaction of making something known or understandable. An alert may refer to a flashing light, a blinking light, a video, turning on or more lights, a green light, a red light, a siren, a noise, or an alarm. For example, a next action may comprise sending the indication signal of "good" the monitoring network. The indication signal may be received by a vehicle. The vehicle may then convey the alert of the green light representing the indication signal of "good."

Figure 3:
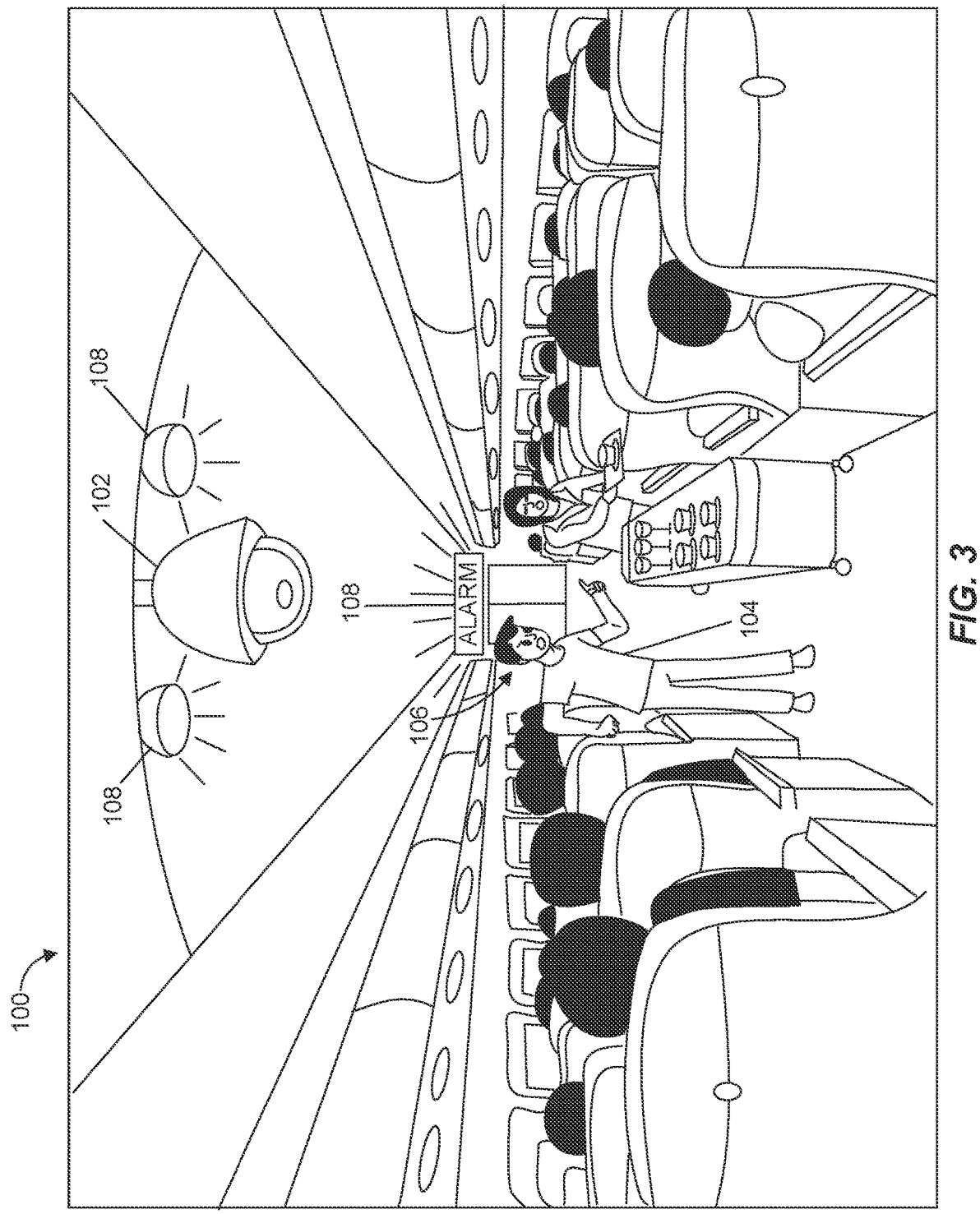
FIG. 3 illustrates an exemplary monitoring system consistent with disclosed embodiments.

FIG. 3 illustrates an exemplary monitoring system consistent with disclosed embodiments. As illustrated in FIG. 3, cabin 100 of a vehicle may include an indication signal which may be configured to convey an alert and/or alarm 108 to passengers 104 of the vehicle in response to passenger behavior 106 and the processing of that behavior by sensor(s) 102. In this example, a noise is being produced as part of the alert/alarm 108 as well as blinking/flashing lights being produced as part of the alert/alarm 108.

In some embodiments, the indication signal may be displayed via a monitor. Displayed may refer to a visual representation of data. A monitor may refer to a device that displays information in pictorial, video, or textual form. A non-limiting example of a monitor may include a flight information display system.

In some embodiments, the assessment signal may not be associated with an identity of the passenger. Associated may refer to a person or thing connected, joined, or similarly related with something else. An identity of a passenger may refer to any information of knowing who a person is. Non-limiting examples of an identity may include biometric information of a passenger or a name of a passenger. For example, the assessment signal may not include any identifying information about the identity of a passenger to protect the privacy of the passenger.

In some embodiments, the passenger behavior may comprise at least one of a body posture, body movement, a physical interaction of the passenger, and an object associated with the passenger. Body posture may refer to how a passenger holds or positions his or her body. Non-limiting examples of body posture may include slouching, crossing arms across a chest or tiling a head. Body movement may refer to a change or not a change in the position of a body part with respect to the whole body. Non-limiting examples of body movement may include blinking an eye, eating, drinking, walking, sitting, bucking, or laying down. A physical interaction of a passenger may refer to a communication, interplay, interchange, exchange, reaction, touch, contact, or other similar reciprocal action between two or more passengers. An object may refer to an article, item, piece, device, or other similar thing. Non-limiting examples of an object may include a baby, a stroller, a wheelchair, a backpack, a ballcap, a piece of luggage, a suitcase, or an animal. For example, a passenger behavior may comprise at least one of a passenger slouching, the passenger drinking, the passenger shouting to a different passenger, and the passenger's sunglasses.

According to another embodiment of the present disclosure, a method for monitoring a vehicle may be provided. Consistent with disclosed embodiments, the method may include a vehicle comprising one or more processors, wherein the one or more processors are configured for sensing, via a sensor interior to a cabin of a vehicle, a passenger behavior of a passenger of the vehicle. The method may also include determining a behavior characteristic based on the passenger behavior, wherein the behavior characteristic is based on one or more of a comparison of the passenger behavior and a stored passenger behavior, a weight parameter associated with the passenger behavior, and a trigger associated with one or more sensors. The method may also include determining the characteristic behavior of a passenger encoding the features detected by the sensors (e.g. face expressions, gestures, actions, or the like.) and comparing them with the encoded behaviors stored in memory. A weight parameter can be associated with the passenger behavior, indicating its level of risk and unsafety. Eventually, a level of risk and unsafety above a certain threshold could trigger an assessment signal. The method may further include determining an assessment signal based on the determined characteristic. The method may also include sending the assessment signal to a monitoring network. The method may further include receiving a proposed action based on the assessment signal. The method may also include determining a next action based on the proposed action. The method may include the monitoring network comprising one or more processors. The method may include, receiving, via the monitoring network, the assessment signal from the vehicle. The method may further include, determining, via the monitoring network, the proposed action based on the assessment signal. The method may also include, sending, via the monitoring network, the proposed action to the vehicle.

Figure 4A:
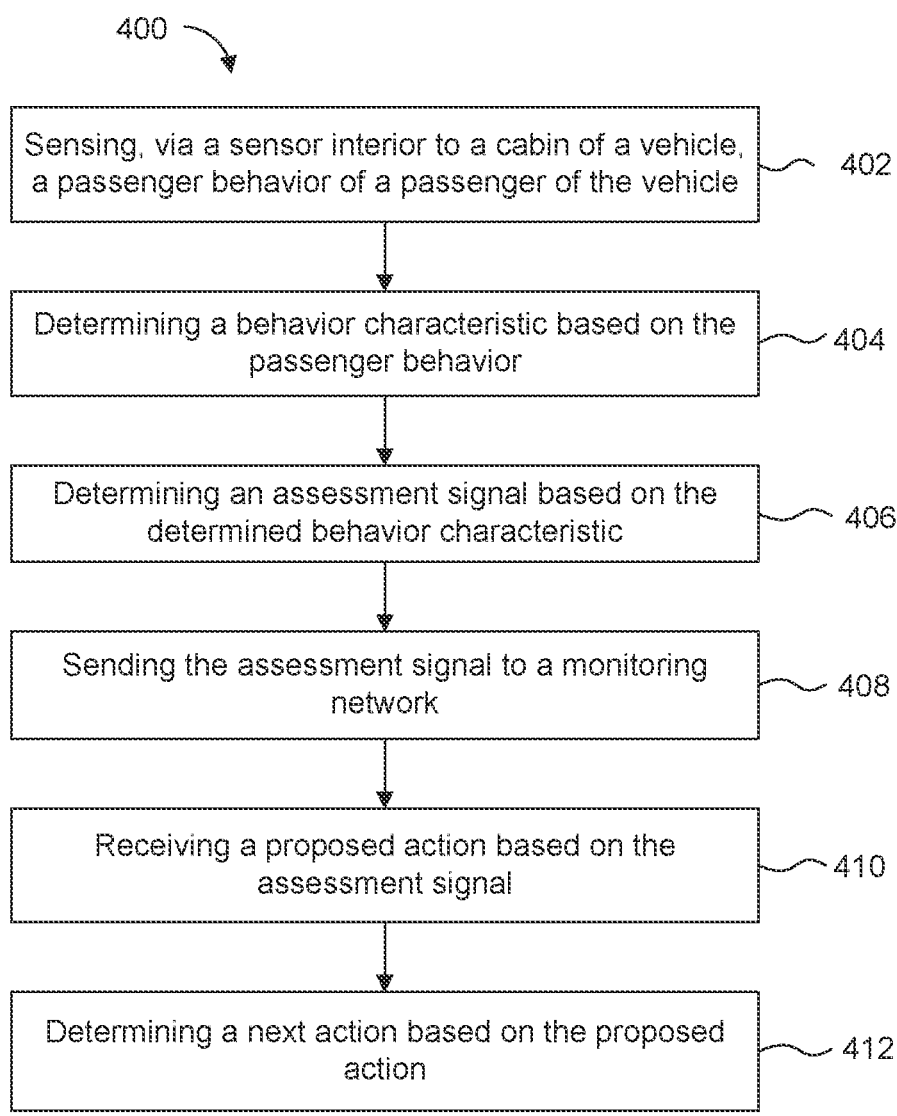
FIG. 4A is a block diagram illustrating an exemplary method of a monitoring system consistent with disclosed embodiments.

FIG. 4A is a block diagram illustrating an exemplary method 400 of a monitoring system consistent with disclosed embodiments. Method 400 may be performed by one or more processors associated with a vehicle and/or a monitoring network. The steps of the disclosed method 400 may be modified in any manner, including by reordering steps and/or inserting or deleting steps. Method 400 may include a step 402 of sensing, via sensor 102 interior to cabin 100 of a vehicle, passenger behavior 106 of passenger 104 of the vehicle. Method 400 may also include a step 404 of determining a behavior characteristic based on passenger behavior 106. Method 400 may further include a step 406 of determining an assessment signal based on the determined behavior characteristic. Method 400 may also include a step 408 of sending the assessment signal to a monitoring network. Method 400 may include a step 410 of receiving a proposed action based on the assessment signal. Method 400 may further include a step 412 of determining a next action based on the proposed action.

Figure 4B:
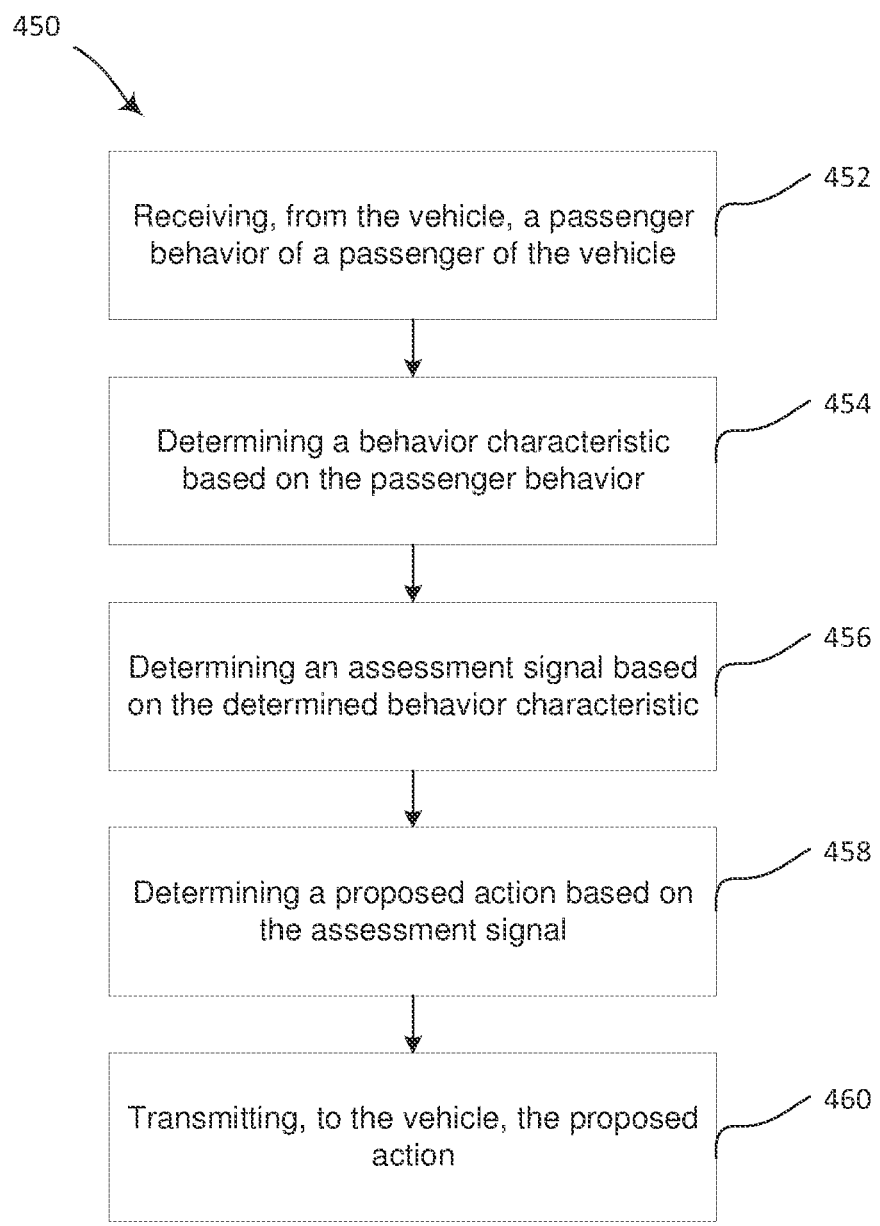
FIG. 4B is a block diagram illustrating an exemplary method of a monitoring system consistent with disclosed embodiments.

FIG. 4B is a block diagram illustrating an exemplary method 450 of a monitoring system consistent with disclosed embodiments. Method 450 may be performed by one or more processors associated with a vehicle and/or a monitoring network. The steps of the disclosed method 450 may be modified in any manner, including by reordering steps and/or inserting or deleting steps. Method 450 may include a step 452 of receiving, from the vehicle, a passenger behavior 106 of a passenger of the vehicle. Method 450 may also include a step 454 of determining a behavior characteristic based on the passenger behavior 106. Method 450 may further include a step 456 of determining an assessment signal based on the determined behavior characteristic. Method 450 may also include a step 458 of determining a proposed action based on the assessment signal. Method 450 may include a step 460 of transmitting, to the vehicle, the proposed action.

The vehicle may act on the proposed action, depending on the vehicle's capability of performing or completing the proposed action. For example, the vehicle may land, park, dock, or otherwise reach a relatively safe or secure location as soon as possible. As another example, the vehicle may be unable to land, stop, park, dock, or otherwise reach a relatively safe and/or secure location before reaching its ultimate destination and may choose to land at its ultimate destination. As another example, the vehicle may provide an alert to fire, police, emergency, or other authorities or the monitoring network as to its location or its next location. As another example, the vehicle may search a database for where services are available such as hospital services, police services, or other services responsive to the determined behavior, and the vehicle may choose to land, stop, park, dock, or otherwise reach a relatively safe and/or secure location associated with those services.

Figure 5A:
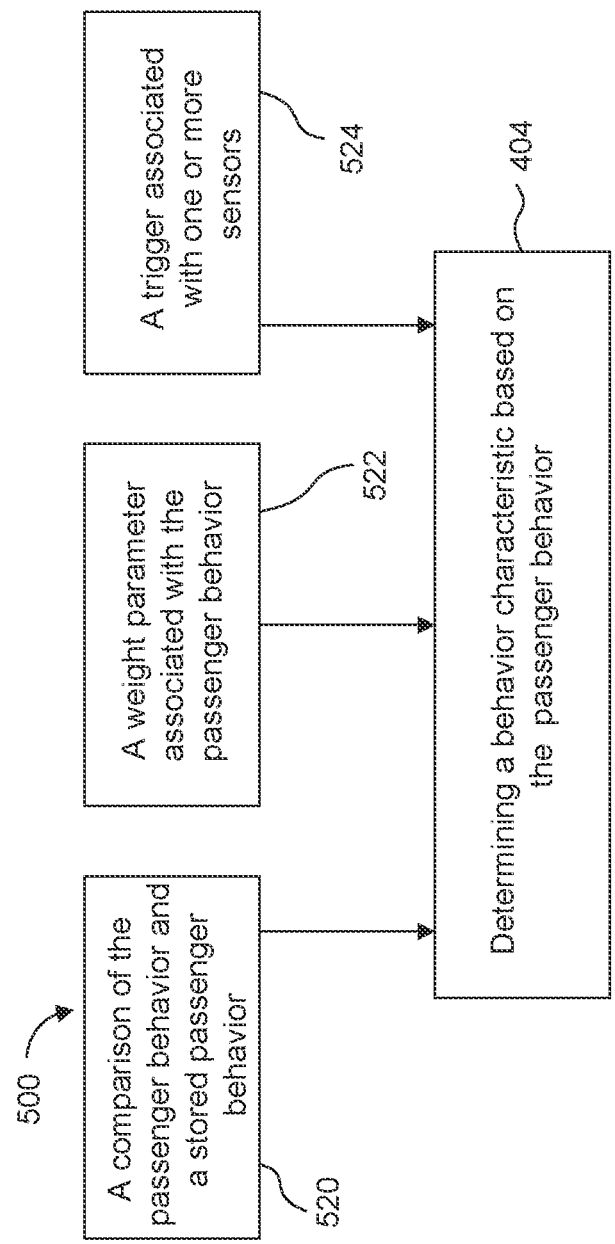
FIG. 5A is a block diagram illustrating an exemplary method of a monitoring system consistent with disclosed embodiments.

FIG. 5A is a block diagram illustrating an exemplary method of a monitoring system consistent with disclosed embodiments. As shown, method 500 may include a step 520 of a comparison of passenger behavior 106 and a stored passenger behavior. Method 500 may also include a step 524 of a weight parameter associated with passenger behavior 106. Method 500 may further include a step 526 of a trigger associated with one or more sensors 102. Method 500 may include a step 404 of determining a behavior characteristic based on at least one of step 520, step 524, or step 526.

Figure 5B:
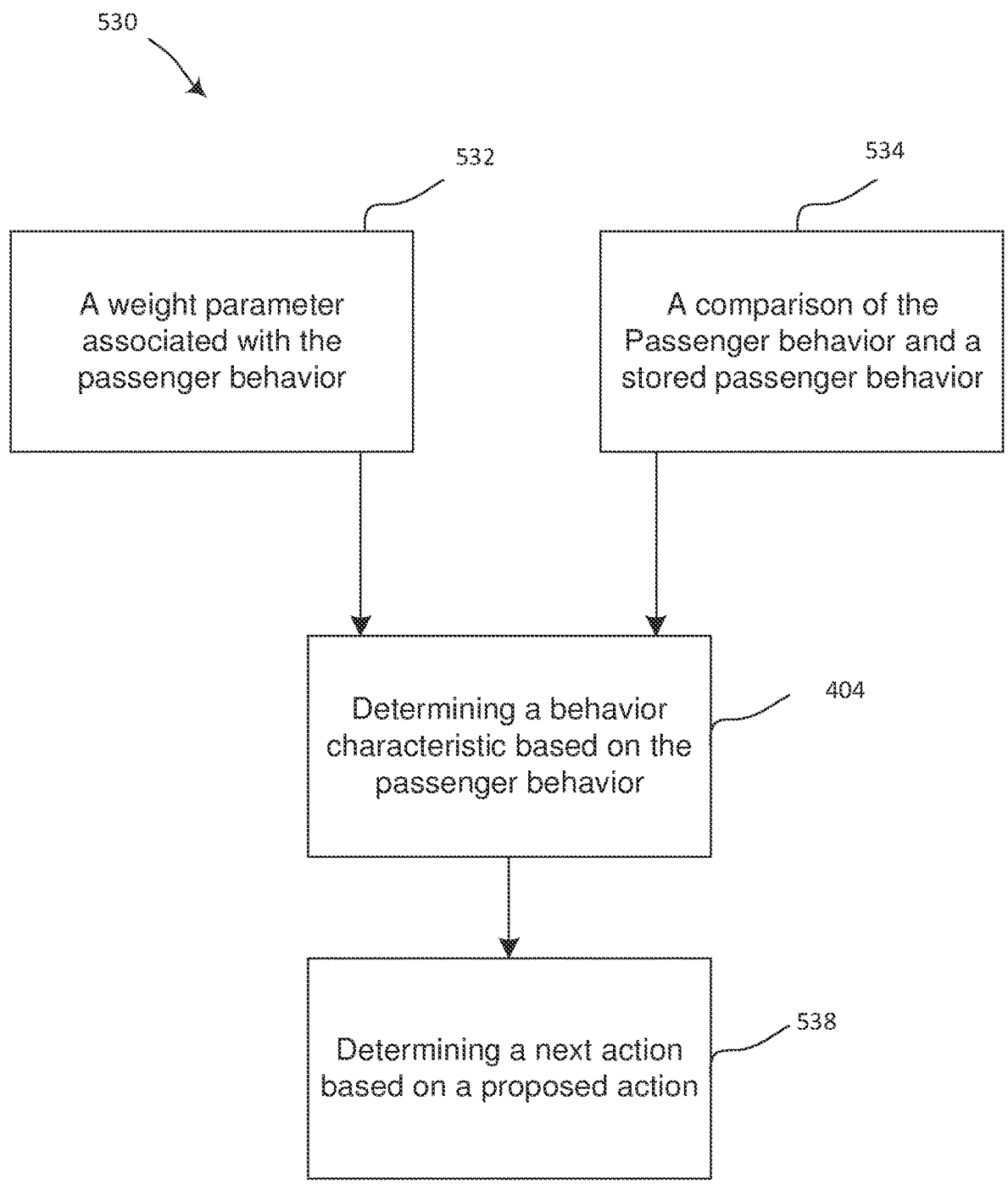
FIG. 5B is a block diagram illustrating an exemplary method of a monitoring system consistent with disclosed embodiments.

FIG. 5B is a block diagram illustrating an exemplary method of a monitoring system consistent with disclosed embodiments. As shown, method 530 may also include a step 532 of a weight parameter associated with passenger behavior 106. Method 530 may include a step 520 of a comparison of passenger behavior 106 and a stored passenger behavior. Method 530 may include a step 404 of determining a behavior characteristic based on at least one of step 524, or step 526. Method 530 may further include a step 538 of determining a next action based on a proposed action.

Figure 6:
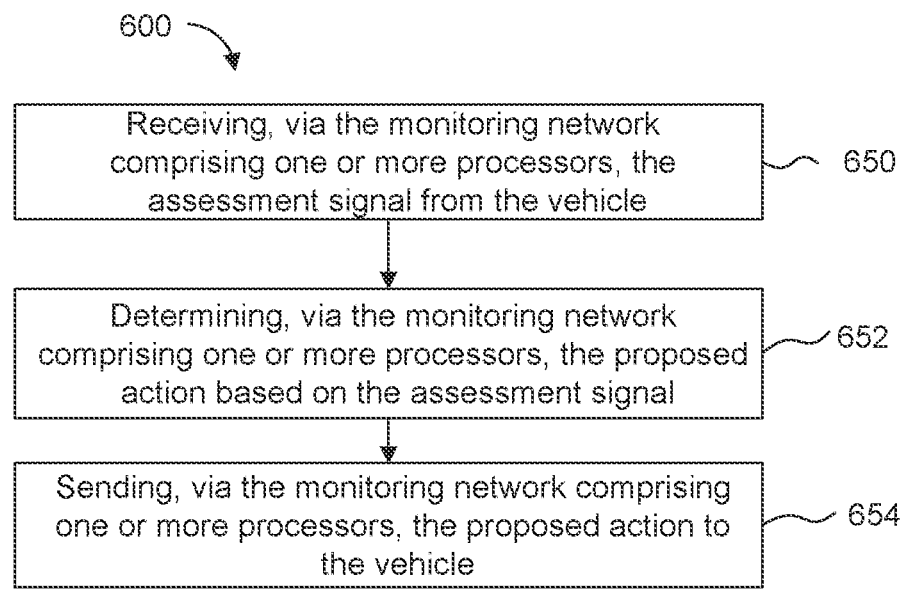
FIG. 6 is a block diagram illustrating an exemplary method of a monitoring network consistent with disclosed embodiments.

FIG. 6 is a block diagram illustrating an exemplary method of a monitoring network consistent with disclosed embodiments. As shown, method 600 may include a step 650 of receiving, via the monitoring network comprising one or more processors, the assessment signal from a vehicle. Method 600 may also include a step 652 of determining, via the monitoring network comprising one or more processors, the proposed action based on the assessment signal. Method 600 may further include a step 654 of sending, via the monitoring network comprising one or more processors, the proposed action to the vehicle.

Figure 7A:
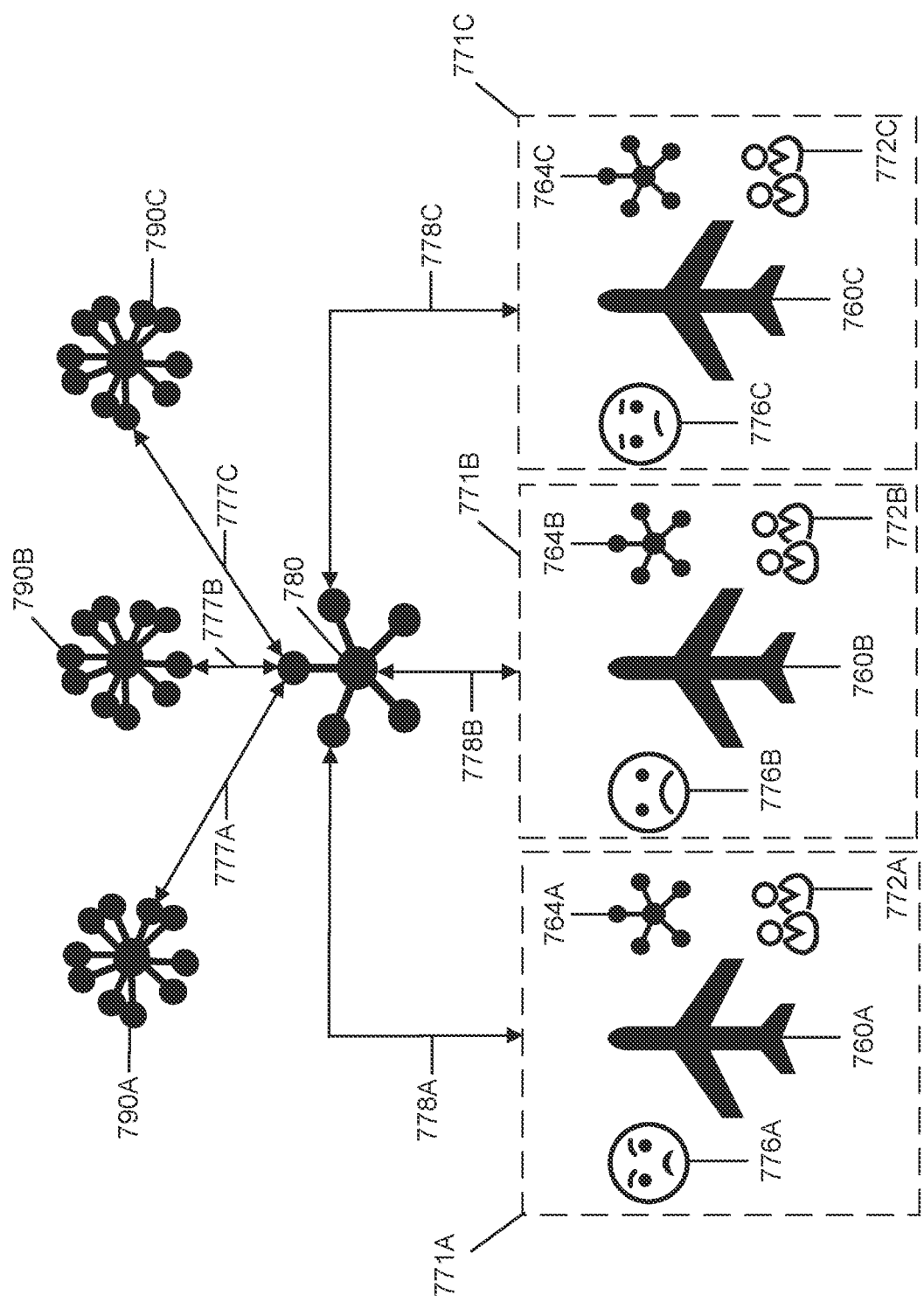
FIG. 7A illustrates an exemplary monitoring system including multiple vehicles consistent with disclosed embodiments.

By way of example, FIG. 7A illustrates an embodiment of the present disclosure including multiple vehicles 760A, 760B, and 760C. Each vehicle 760A, 760B, and 760C may have vehicle monitoring system 771A, 771B, and 771C. Each vehicle may have passenger group 772A, 772B, and 772C. Each vehicle may also have at least one processor 764A, 764B, and 764C. Each passenger group may have behavior characteristic 776A, 776B, and 776C. Disclosed embodiments may include a monitoring network 780 which may receive communications 778A, 778B, and 778C, wherein the communications 778A, 778B, and 778C each comprise one or more of sensor information, assessment signals, and/or behavior characteristics, from each at least one processor 764A, 764B, and 764C. Advantageously, the monitoring network 780 may send communications 777A, 777B, and 777C to checking networks 790A, 790B, and 790C, wherein the communications 777A, 777B, and 777C each comprise one or more of sensor information, assessment signals, and/or behavior characteristics, for each vehicle 760A, 760B, and 760C.

In some embodiments the checking networks 790A, 790B, and 790C may verify and/or update the assessment signal from any or all of vehicles 760A, 760B, and 760C based on one or more of reported sensor information, behavior characteristics, stored information for each associated passenger, filtered sensor information for each passenger to maintain privacy, unfiltered sensor information if the initial assessment signal exceeds a threshold for example associated with a high safety/health risk, an input by one or more passengers, vehicle staff, or monitoring users, and/or as otherwise disclosed herein.

In some embodiments, the monitoring network 780 verify and/or update the assessment signal from any or all of vehicles 760A, 760B, and 760C based on one or more of reported sensor information, behavior characteristics, stored information for each associated passenger, filtered sensor information for each passenger to maintain privacy, unfiltered sensor information if the initial assessment signal exceeds a threshold for example associated with a high safety/health risk, an input by one or more passengers, vehicle staff, or monitoring users, and/or as otherwise disclosed herein. The stored information of each associated passenger may be general (e.g., tall, male) or may be specific (e.g., a picture identification). The filtered sensor information may, for example, exclude facial features, modulate a voice, or otherwise mask an identity of a passenger. The unfiltered sensor information may be a recording without filtering. A processor of the monitoring network 780 or a processor of the check network 790 may be configured to apply the filtering. The application of the filtering may be based on a threshold associated with the assessment signal. Sensor data associated with a lower-level assessment signal may be filtered, where sensor data associated with a higher-level assessment signal may be unfiltered. A processor of the vehicle 760, a monitoring network 780, and/or a processor of the check network 790 assessment signal may be assigned a value as disclosed herein to determine a lower or higher level.

The monitoring network 780 and/or check networks 790A, 790B, and 790C may be configured to provide an updated assessment signal and/or a proposed or determined action based on delta, volatility, and false positives. As described above, check networks 790A, 790B, and 790C may send the verification and/or the updated assessment signal and/or a proposed or determined action within communications 777A, 777B, and 777C, including determining one or more of delta, volatility, and false positives. Advantageously, one or more of delta, volatility, and false positives may be aggregated and/or averaged to improve next determinations of proposed actions within monitoring network 780 and/or checking networks 790A, 790B, and 790C. This may be advantageous because the monitoring network 780 can be trained/improved via the aggregation and averages of one or more of delta, volatility, and false positives to improve next determinations of proposed action. Check networks 790A, 790B, and 790C may send the verification and/or the updated assessment signal and/or a proposed or determined action within communications 777A, 777B, and 777C to monitoring network 780 and/or directly (not shown) to vehicles 760A, 760B, and 760C. The assessment signal and/or proposed or determined action may then be sent from the monitoring network 780 to one or more of vehicles 760A, 760B, and 760C as appropriate and specific to each vehicle.

Figure 7B:
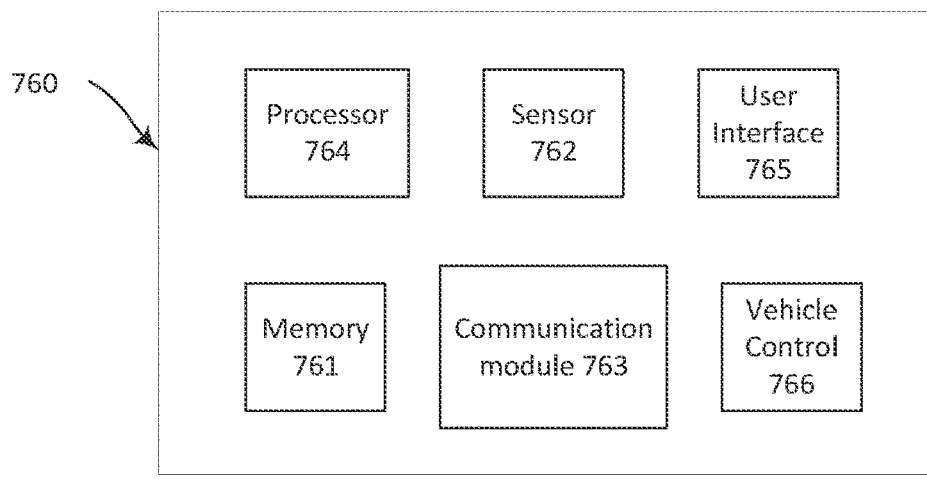
FIG. 7B illustrates an exemplary vehicle consistent with disclosed embodiments.

By way of example, FIG. 7B illustrates an embodiment of the present disclosure including a system of a vehicle. The vehicle 760 is represented by aircraft symbols of 760A, 760B, and 760C in FIG. 7A, but it is understood that the vehicle may be any vehicle disclosed herein. Vehicle 760 may comprise one or more of memory 761, sensor 762, communication module 763, processor 764, user interface 765, and physical controls 766. Vehicle 760 may be configured to perform certain steps of methods disclosed herein, such as for FIG. 4A, 5A, or 5B. For example, processor 764 may control and/or communicate with one or more other components of vehicle 760. Processor 764 may receive inputs from or provide outputs to memory 761, sensor 762, communication module 763, user interface 765, and physical controls 766.

Communication module 763, user interface 765, vehicle control 766, and/or sensor 762 may comprise one or more processors and memory, with the processor(s) configured to perform instructions associated with those modules. Memory 761 may be configured to store information related to one or more recorded information from sensors 762, behaviors and/or assessment signals. Processor 764 may consult a database associated with memory 761 to compare one or more behaviors and/or assessment signals with a database of behaviors and/or assessment signals. Processor 764 may be configured to perform instructions stored on memory 761.

Sensor 762 may be a software module associated with one or more sensors discussed herein for monitoring passengers. Sensor 762 may comprise one or more processors. For example, sensor 762 may be configured to move or change a setting in response to user or passenger actions or inputs. For example, sensor 762 may comprise a camera configured to move in response to a user command through a user interface 765, based on a passenger movement, or to capture more or less light depending on lighting in the passenger area.

Communication module 763 may be configured to receive input from or provide output external from vehicle 760, such as to/from monitoring network 780 and/or checking networks 790A, 790B, 790C as shown in FIG. 7A. For example, communication module 763 may receive or provide communications 778A shown in FIG. 7A. Communication module 763 may be a software module associated with a transceiver, radio, or other communication method from a vehicle to a monitoring system.

User interface 765 may be configured to receive input from or provide output to one or more of passengers of a vehicle and/or operators or staff of the vehicle. For example, as described herein user interface 765 may provide an alert or warning in the form of a recorded message, an alarm, or other alert as disclosed herein as part of a determined next action. User interface 765 may be associated with one or more displays, lights, microphones, and speakers. As another example, user interface 765 may receive a request from a passenger for medical assistance, a request from an operator or staff of the vehicle for help, or another request as disclosed herein. User interface 765 may be a software module associated with a display, touchscreen, one or more physical or graphical user interface buttons or switches, or other embodiments as disclosed herein.

Physical interface 766 may be configured to receive input from or provide output to processor 764. For example, as described physical interface 766 may provide a current position of the vehicle relative to a nearby desired destination. As another example, physical interface 766 may receive a command from processor 764 associated with a determined next action to stop at the nearest desired destination or take another action consistent with disclosed embodiments. User interface 765 may be a software module associated with a vehicle's controls including navigation or position sensors, directional control, speed control, visual displays for operators or staff of the vehicle, or other embodiments as disclosed herein.

Figure 7C:
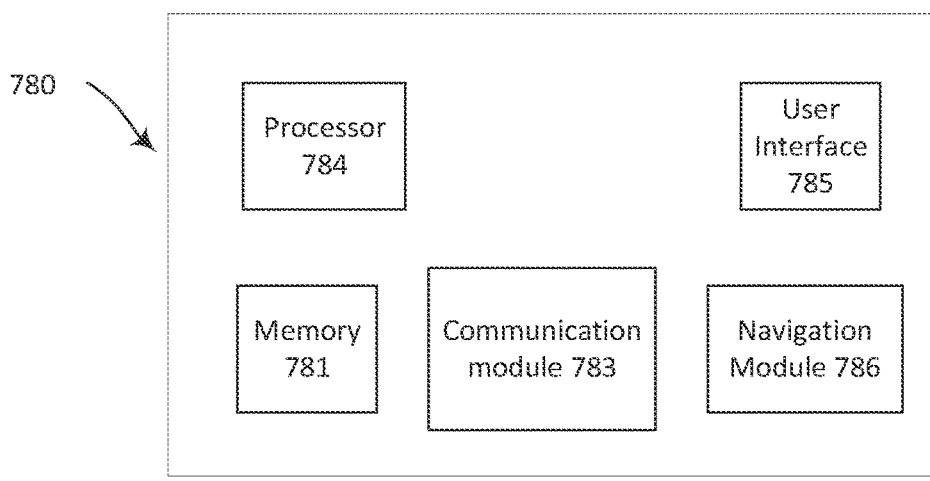
FIG. 7C illustrates an exemplary monitoring network consistent with disclosed embodiments.

By way of example, FIG. 7C illustrates an embodiment of the present disclosure including a system of a vehicle. Monitoring network 780 may comprise one or more of memory 781, communication module 783, processor 784, and user interface 785. Monitoring network 780 may be configured to perform certain steps of methods disclosed herein, such as for FIG. 4B, 5A, 5B, or 6. For example, monitoring network 780 may communicate with one or more of vehicles 760A, 760B, and 760C and/or checking networks 790A, 790B, and 790C shown in FIG. 7A. Processor 784 may communicate with and/or control other components of monitoring network 780. Processor 784 may receive inputs from or provide outputs to memory 781, communication module 783, user interface 785, and navigation module 786.

User interface 785, communication module 783, and/or navigation module 786 may comprise one or more processors and memory, with the processor(s) configured to perform instructions associated with those modules.

User interface 785, communication module 783, and/or navigation module 786 may comprise memory configured to store instructions associated with the processors. Memory 781 may be configured to store information related to one or more recorded information from a sensor of a vehicle (e.g., sensor 762), behaviors, and/or assessment signals. Processor 784 may consult a database associated with memory 781 to compare one or more behaviors and/or assessment signals with a database of behaviors and/or assessment signals. Processor 784 may be configured to perform instructions stored on memory 781.

Communication module 783 may be configured to receive input from or provide output external from monitoring network 780, such as to/from monitoring network 780 and/or checking networks 790A, 790B, 790C as shown in FIG. 7A. For example, communication module 783 may receive or provide communications 778A and 777A shown in FIG. 7A. Communication module 783 may be a software module associated with a transceiver, radio, or other communication method from a monitoring system to a vehicle or another network system.

User interface 785 may be configured to receive input from or provide output to one or more of operators or staff of the monitoring system. For example, as described herein user interface 785 may provide an alert or warning to a graphical user interface if a vehicle (e.g., vehicle 760A of FIG. 7A) reports an assessment signal or behavior. As another example, user interface 785 may be configured to receive input from an operator to process a behavior and/or an assessment signal and/or communication with a vehicle (e.g., vehicle 760A of FIG. 7A). User interface 785 may be a software module associated with a display, touchscreen, one or more graphical user interfaces, or other embodiments as disclosed herein.

Navigation module 786 may be configured to receive input from or provide output to processor 784. For example, navigation module 786 may be able to determine a current position of a vehicle (e.g., vehicle 760A). The information from navigation module 786 may be used to determine a proposed action or a determined action for the vehicle, consistent with disclosed embodiments. User interface 785 may be a software module associated with a monitoring network including communications, navigation, or other embodiments as disclosed herein.

Figure 7D:
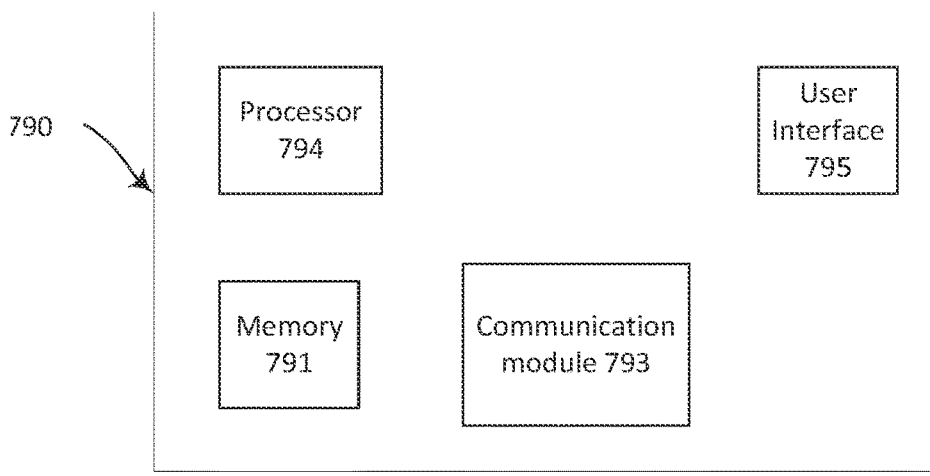
FIG. 7D illustrates an exemplary check system consistent with disclosed embodiments.

By way of example, FIG. 7D illustrates an embodiment of the present disclosure including a check network. Check network 790 may comprise one or more of memory 791, communication module 793, processor 794, and user interface 795. Check network 790 may be configured to perform certain steps of methods disclosed herein, such as for FIG. 5A or 5B. For example, processor 794 may control and/or communicate with one or more other components of check network 790. Processor 794 may receive inputs from or provide outputs to memory 791, communication module 793, and user interface 795.

User interface 795 and/or communication module 793 may comprise one or more processors to perform instructions associated with those modules. User interface 795 and/or communication module 793 may comprise memory configured to store instructions associated with the processors. Memory 791 may be configured to store information related to recorded information from sensors of a vehicle (e.g., sensor 762) one or more behaviors and/or assessment signals. Processor 794 may consult a database associated with memory 791 to compare one or more behaviors and/or assessment signals with a database of behaviors and/or assessment signals. Processor 794 may be configured to perform instructions stored on memory 791. Memory 791 may be configured to store recorded information from one or more sensors 792.

Communication module 793 may be configured to receive input from or provide output external from monitoring network 790, such as to/from monitoring network 780 and/or vehicles 760A, 760B, 760C as shown in FIG. 7A. For example, communication module 793 may receive or provide communications 777A shown in FIG. 7A. Communication module 793 may be a software module associated with a transceiver, radio, or other communication method from a vehicle to a monitoring system.

User interface 795 may be configured to receive input from or provide output to one or more operators or staff of the check network. For example, as described herein user interface 795 may provide an alert or warning in the form of a graphical user interface or other alert as disclosed herein, for example associated with one or more vehicles (e.g., vehicles 760A, 760B, 760C) that may report an assessment signal or behavior. As another example, user interface 795 may be configured to receive input from an operator to process a behavior and/or an assessment signal and/or communication with a vehicle (e.g., vehicle 760A of FIG. 7A). User interface 795 may be a software module associated with a display, touchscreen, one or more graphical user interfaces, or other embodiments as disclosed herein.

It is to be understood that the configuration and boundaries of the functional building blocks of the monitoring system have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It will be apparent to persons skilled in the art that various modifications and variations can be made to disclosed vehicle monitoring systems. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A monitoring system comprising:
    a vehicle comprising one or more processors, wherein the one or more processors are configured to:
        sense, via a sensor interior to a cabin of the vehicle, a passenger behavior of a passenger of the vehicle;
        determine a behavior characteristic based on the passenger behavior, wherein the behavior characteristic is based on one or more of:
            a comparison of the passenger behavior and a stored passenger behavior; or
            a weight parameter associated with the passenger behavior;
        determine, based on the comparison, an assessment signal based on the behavior characteristic, wherein the assessment signal indicates that a level of risk of the passenger behavior exceeds a threshold;
        send the assessment signal to a monitoring network;
        receive a proposed action based on the assessment signal; and
        determine a next action based on the proposed action; and
    the monitoring network comprising one or more processors, wherein the one or more processors of the monitoring network are configured to:
        receive the assessment signal from the vehicle;
        make a determination of whether the assessment signal accurately indicates that the level of risk of the passenger behavior exceeds the threshold by comparing user input to the assessment signal;
        determine the proposed action based on the assessment signal and the determination; and
        send the proposed action to the vehicle.

2. The monitoring system of claim 1, wherein the sensor is an image sensor with a wide-angle lens configured to capture the passenger behavior.

3. The monitoring system of claim 1, wherein the one or more processors of the monitoring network are further configured to:
    send the assessment signal to a check monitoring network and determine the proposed action based on the check monitoring network and the assessment signal.

4. The monitoring system of claim 1, wherein the next action comprises sending an indication signal, wherein the indication signal is configured to convey an alert to the passenger of the vehicle.

5. The monitoring system of claim 4, wherein the indication signal is displayed via a monitor or display.

6. The monitoring system of claim 1, wherein the assessment signal is not associated with an identity of the passenger.

7. The monitoring system of claim 1, wherein the passenger behavior comprises at least one of a body posture, a body movement, a physical interaction of the passenger, or an object associated with the passenger.

8. A monitoring system comprising:
    a vehicle comprising one or more processors, wherein the one or more processors are configured to:
        sense, via a sensor of the vehicle, a passenger behavior of a passenger of the vehicle;
        determine an assessment signal based on the the passenger behavior, wherein the assessment signal indicates that a level of risk of the passenger behavior exceeds a threshold;
        send the assessment signal to a monitoring network;
        send a recorded sensor data from the sensor to the monitoring network;

receive a proposed action based on the assessment signal; and determine a next action based on the proposed action;

the monitoring network comprising one or more processors, wherein the one or more processors of the monitoring network are configured to:

receive the recorded sensor data and the assessment signal;

determine a behavior characteristic based on the passenger behavior, wherein the behavior characteristic is based on one or more of:

a first comparison of the passenger behavior and a first stored passenger behavior, wherein the first stored passenger behavior is stored on a first memory associated with the monitoring network; or a weight parameter associated with the passenger behavior;

send the behavior characteristic to a check network; and send the proposed action to the vehicle; and the check network comprising one or more processors, wherein the one or more processors of the check network are configured to:

verify the assessment signal based on a second comparison of the passenger behavior and a second stored passenger behavior, wherein the second stored passenger behavior is stored on a second memory associated with the check network;

make a determination of whether the assessment signal accurately indicates that the level of risk of the passenger behavior exceeds the threshold by comparing user input to the assessment signal;

determine the proposed action based on the assessment signal and the determination; and send the proposed action to the monitoring network.

9. The monitoring system of claim 8, wherein one or more of the first and second stored passenger behaviors are an aggregate of recorded passenger behaviors or a number of selected passenger behaviors.

10. The monitoring system of claim 8, wherein the next action comprises sending an indication signal, wherein the indication signal is configured for conveying an alert to the passenger of the vehicle.

11. The monitoring system of claim 10, wherein the indication signal is displayed via a monitor or display.

12. The monitoring system of claim 8, wherein the assessment signal is filtered to exclude an identity of the passenger.

13. The monitoring system of claim 8, wherein the passenger behavior comprises at least one of a body posture, a body movement, a physical interaction of the passenger, and an object associated with the passenger.

14. A monitoring method comprising:

sensing, via a sensor interior to a cabin of a vehicle, a passenger behavior of a passenger of the vehicle;

determining a behavior characteristic based on the passenger behavior, wherein the behavior characteristic is based on one or more of:

a comparison of the passenger behavior and a stored passenger behavior;

a weight parameter associated with the passenger behavior; or a trigger associated with one or more sensors;

determining an assessment signal based on the behavior characteristic, wherein the assessment signal indicates that a level of risk of the passenger behavior exceeds a threshold;

sending the assessment signal to a monitoring network;

receiving a proposed action based on the assessment signal;

determining a next action based on the proposed action;

receiving the assessment signal from the vehicle;

making a determination of whether the assessment signal accurately indicates that the level of risk of the passenger behavior exceeds the threshold by comparing user input to the assessment signal;

determining the proposed action based on the assessment signal and the determination; and sending the proposed action to the vehicle.

15. The method of claim 14, further comprising:

sending the assessment signal to a check monitoring network and determining the proposed action based on the check monitoring network and the assessment signal.

16. The method of claim 14, wherein the next action comprises sending an indication signal, wherein the indication signal is configured for conveying an alert to the passenger of the vehicle.

17. The method of claim 16, wherein the indication signal is displayed via a monitor or display.

18. The method of claim 14, wherein the assessment signal is not associated with an identity of the passenger.

19. The method of claim 14, wherein the passenger behavior comprises at least one of a body posture, a body movement, a physical interaction of the passenger, or an object associated with the passenger.

20. The method of claim 14, wherein the sensor is configured to detect at least one of a sound, an image, a light, a signal, a force, a pressure, a temperature, or a gas.

* * * * *